US005368283A

United States Patent [19]

Pavlin

[11] Patent Number: 5,368,283

[45] Date of Patent: Nov. 29, 1994

[54] TORSION SPRING ASSEMBLY WITH INTERLOCKING BUSHINGS

[75] Inventor: Robert J. Pavlin, Grand Haven, Mich.

[73] Assignee: Precision Products Group, Inc., Muskegon, Mich.

[21] Appl. No.: 102,243

[22] Filed: Aug. 5, 1993

[51] Int. Cl.$^5$ .................... F16F 1/06

[52] U.S. Cl. .................... 267/155; 267/169

[58] Field of Search .................... 267/154–157, 267/169, 170, 179, 275; 403/111, 229; 261/65; 123/198 D; 74/110, 513

[56] References Cited

U.S. PATENT DOCUMENTS

| | | | |
|---|---|---|---|
| 3,930,380 | 1/1976 | Fogt | 403/229 |
| 4,597,474 | 7/1986 | Nagano | 267/155 |
| 4,793,444 | 12/1988 | Nagano | 267/155 |
| 4,828,235 | 5/1989 | Paggeot | 267/155 |
| 4,838,387 | 6/1989 | Yoshigai | 188/24.41 |

*Primary Examiner*—Andres Kashnikow
*Assistant Examiner*—Chris Schwartz
*Attorney, Agent, or Firm*—Leydig, Voit & Mayer

[57] ABSTRACT

A torsion spring assembly particularly adapted for use in closing the throttle valve of an automotive throttle body. The assembly includes two bushings formed with sleeves adapted to telescope into the end portions of a torsion spring. As an incident thereto, the bushings automatically interlock with one another to hold the bushings and the spring in assembled relation.

9 Claims, 2 Drawing Sheets

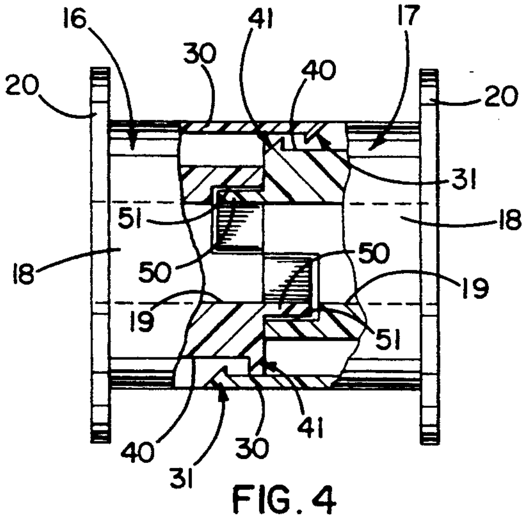
FIG. 4
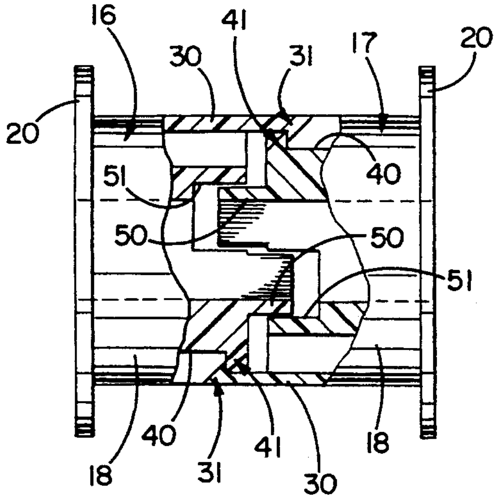
FIG. 5
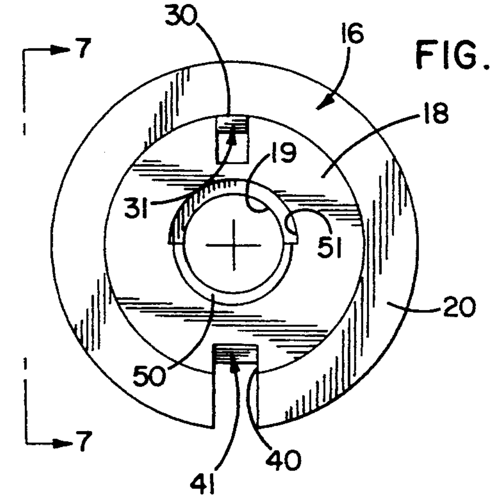
FIG. 6
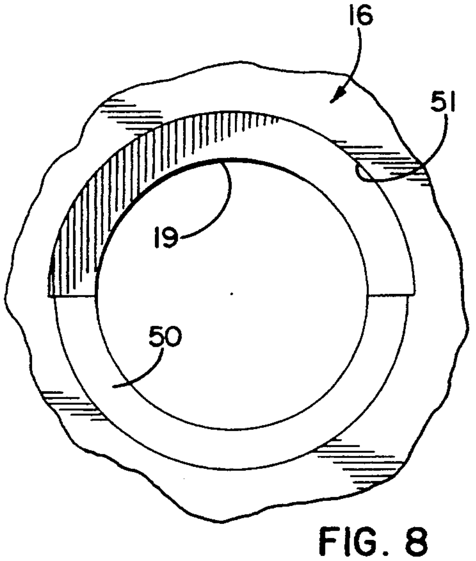
FIG. 8
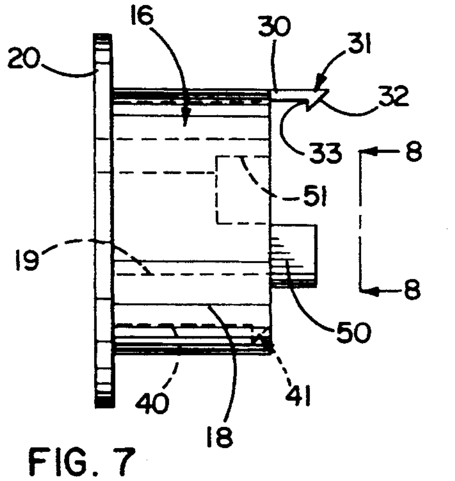
FIG. 7
FIG. 9
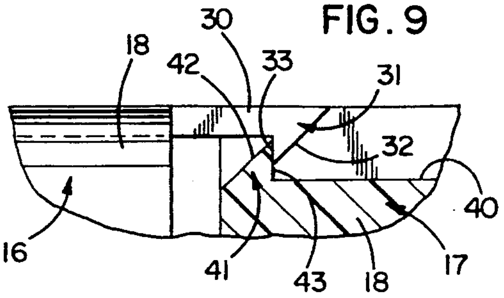

TORSION SPRING ASSEMBLY WITH INTERLOCKING BUSHINGS

BACKGROUND OF THE INVENTION

This invention relates to a torsion spring assembly having a torsion spring which, when loaded torsionally, exerts a biasing force on a member associated with the spring. The invention more particularly relates to a torsion spring of the type which is defined by a plurality of helically wound coils and by two radially projecting end tangs, the spring being loaded torsionally when one of the end tangs is moved angularly relative to the other end tang.

While the spring assembly of the invention may be used in various applications, it is particularly suitable for use in effecting closure of the throttle valve of the throttle body or carburetor of an automotive internal combustion engine. A spring assembly of this general type is disclosed in Paggeot U.S. Pat. No. 4,828,235. In that assembly, two flanged bushings are telescoped into the end portions of the spring and mount the spring on the shaft of the throttle body. The end coils of the spring are of reduced diameter and are capable of tightly gripping the bushings in order to hold the bushings in assembled relation with the spring.

By virtue of the bushings, the coils of the spring of the Paggeot spring assembly are held in concentric relation with the shaft so that, when wound, the coils remain substantially uniform without substantial canting and without causing any substantial friction, sawing action or wear. While the spring assembly functions admirably in many applications, it does suffer some draw backs. In some cases, it is necessary that all of the spring coils be fully active in order to achieve a specified spring rate with acceptable endurance stress levels. Because the end coils of the Paggeot spring are contracted around the bushings in order to keep the bushings assembled with the spring, the end coils are not fully active. Also, it is somewhat difficult to assemble the spring and bushings of the Paggeot spring assembly.

SUMMARY OF THE INVENTION

The general aim of the present invention is to provide a new and improved torsion spring assembly in which bushings are held in assembled relation with a spring without need of relying on the spring coils for that purpose thereby to enable all of the coils to be fully active at all times.

A further object of the invention is to provide a spring assembly in which the bushings and spring may be more quickly and easily assembled.

A more detailed object is to achieve the foregoing by providing bushings which are adapted to be telescoped into the ends of the spring and then locked together with a snap fit.

Still another object is to provide a spring assembly with interlocking bushings which may be adjusted in overall length to conform to available space requirements.

The invention also resides in the unique provision of means for facilitating angular alignment of the bushings during assembly.

These and other objects and advantages of the invention will become more apparent from the following detailed description when taken in conjunction with the accompanying drawings.

BRIEF DESCRIPTION OF THE DRAWINGS

FIG. 4 is an enlarged elevational view of the assembled bushings, certain parts of the bushings being broken away and shown in cross-section.

FIG. 5 is a view similar to FIG. 4 but shows the bushings in adjusted positions.

FIG. 6 is an end view of the inboard end of one of the bushings shown in FIG. 4.

FIG. 7 is an elevational view of the bushing of FIG. 6 as seen along the line 7—7 of FIG. 6.

FIG. 8 is an enlarged fragmentary end view of certain components of the bushing of FIG. 7 as seen along the line 8—8 of FIG. 7.

FIG. 9 is an enlarged fragmentary view of certain components of the bushings shown in FIG. 5.

DETAILED DESCRIPTION OF THE PREFERRED EMBODIMENT

Figure 2:
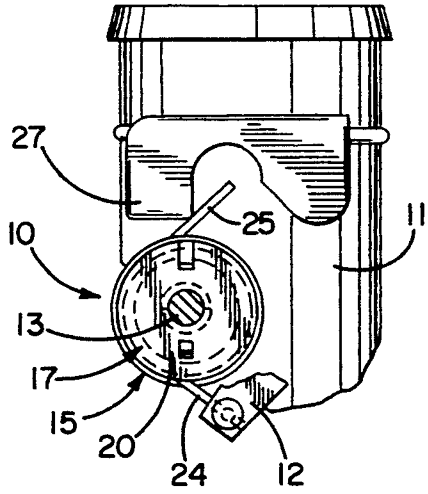
FIG. 2 is a fragmentary cross-section taken substantially along the line 2—2 of FIG. 1.

For purposes of illustration, the spring assembly 10 of the present invention is shown in the drawings in conjunction with the throttle body 11 of an automotive internal combustion engine. Briefly, the throttle body includes a lever 12 supported to rotate about the axis of a shaft 13 (FIG. 2). Rotation of the lever in one direction effects opening of the throttle valve (not shown) of the throttle body 11 while reverse rotation of the lever by the spring assembly 10 effects closing of the valve. Reference may be made to Blanchard et al U.S. Pat. No. 4,582,653 for a more detailed disclosure of a typical throttle body equipped with a spring assembly for returning a throttle valve toward a closed position.

Figure 3:
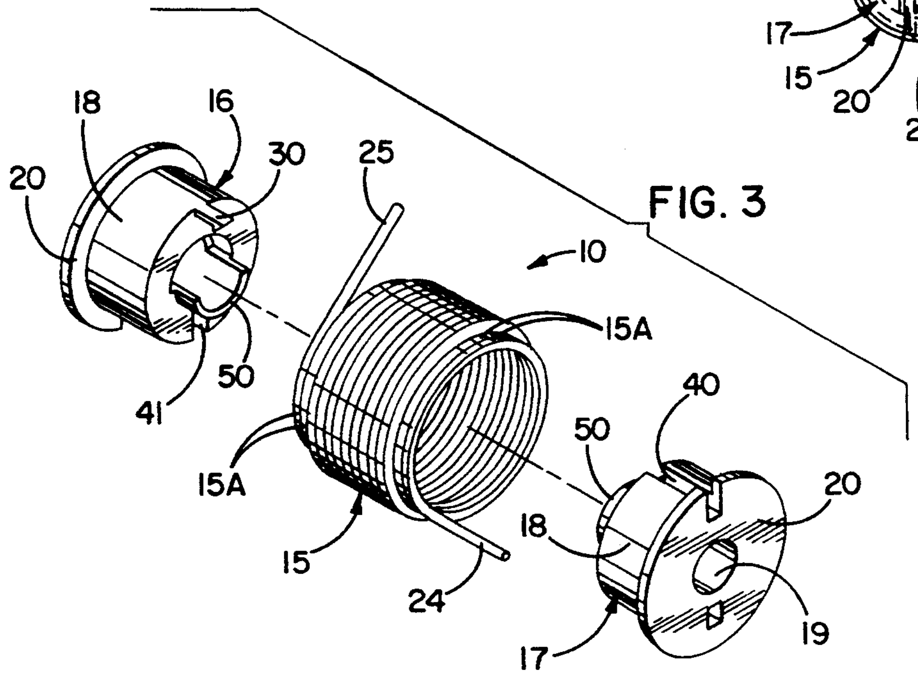
FIG. 3 is an exploded perspective view of the spring assembly.

The spring assembly 10 is similar to that disclosed in the aforementioned Paggeot patent in that the present spring assembly includes a coiled torsion spring 15 and a pair of end bushings 16 and 17 (FIG. 3) which preferably are molded of plastic. Herein, the two bushings are identical to one another and each includes a cylindrical sleeve 18 formed with a central bore 19. A flange 20 is formed integrally with and projects radially outwardly from the outboard end of each sleeve.

Figure 1:
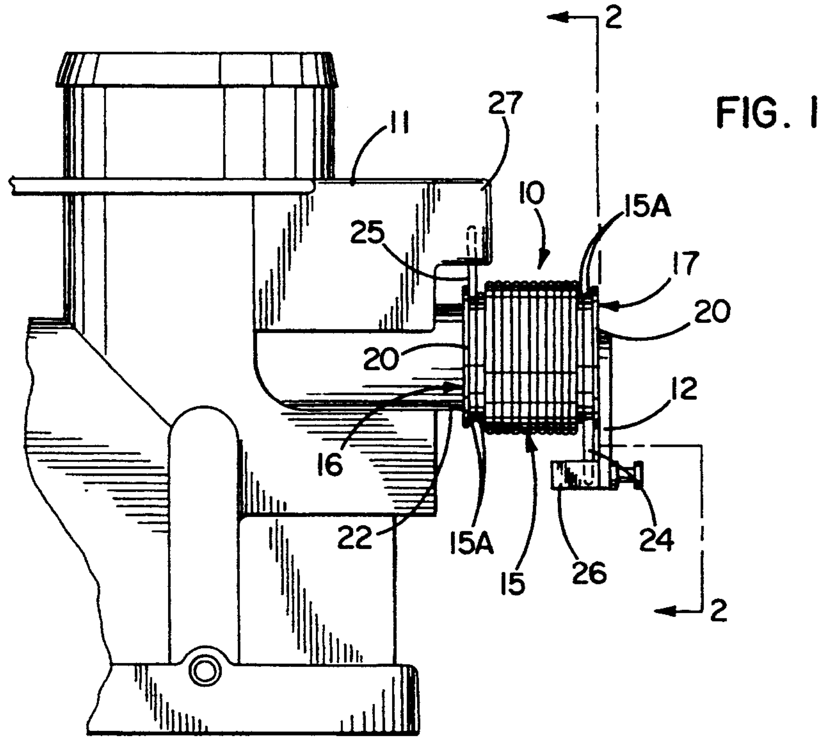
FIG. 1 is an elevational view of a typical throttle body equipped with a new and improved torsion spring assembly incorporating the unique features of the present invention.

When the spring assembly 10 is assembled with the throttle body 11, the sleeves 18 of the bushings 16 and 17 telescope over the shaft 13 with a close fit. The assembly 10 is captivated axially in one direction on the shaft by virtue of the outboard end of the flange 20 of the bushing 16 abutting against the end of a tubular portion 22 (FIG. 1) of the throttle body. The lever 12 captivates the spring assembly axially on the shaft in the other direction by engaging the flange 20 of the bushing 17.

The torsion spring 15 is wound helically from round music wire and is formed with two radially extending end tangs 24 and 25. The tang 24 engages a tab 26 on the lever 12 while the tang 25 bears against an ear 27 of the throttle body 11. In the spring which has been specifically illustrated, two coils 15A adjacent each end of the spring are of reduced diameter. The coils could, however, be of uniform diameter along the entire length of the spring and in many cases will be of uniform diameter.

In accordance with the present invention, the bushings 16 and 17 are uniquely constructed to interlock with one another as an incident to being assembled with the spring 15. As a result, the bushings are held in assembled relation with one another and with the spring without need of the spring coils being contracted around and resiliently gripping the sleeves 18 of the bushings. This enables all of the spring coils to be fully active so that the spring may obtain a desired spring rate while meeting endurance specifications.

More specifically, the sleeve 18 of each bushing 16, 17 is formed with an elongated finger 30 (FIGS. 4, 7 and 8) which projects cantilever fashion from the inboard end of the sleeve. The free end portion of each finger is formed with a detent or hook 31 (FIG. 9) having an inclined cam surface 32 and a radially extending shoulder 33.

The sleeve 18 of each bushing 16, 17 also is formed with an axially extending groove 40 (FIGS. 4, 6 and 8) spaced diametrically from the finger 31 of the sleeve and sized to slidably but snugly receive the finger of the other bushing. Formed at the inboard end of each groove is a detent or hook 41 (FIG. 9) having an inclined cam surface 42 and a radially extending shoulder 43.

With the foregoing arrangement, the two bushings 16 and 17 may be interlocked by orienting the bushings angularly such that the finger 30 of each bushing is aligned angularly with the groove 40 of the other bushing. As the bushings are moved axially toward one another, the cam surfaces 32 and 42 of the hooks 31 and 41 engage one another to cause the fingers 30 to flex radially outwardly. As soon as the shoulders 33 of the hooks 31 clear the shoulders 43 of the hooks 41, the fingers snap inwardly to locate the shoulders 33 in face-to-face relation with the shoulders 43 and captivate the bushings against axial separation.

Preferably, means are provided for facilitating interlocking of the bushings 16 and 17 and for holding the bushings in secure axial alignment. Herein, these means comprise a dowel 50 shaped generally as a half-cylinder and formed integrally with and projecting axially from the inboard end of the sleeve 18 of each bushing. The inner surface of each dowel 50 is concentric with and forms a continuation of the bore 19 in the sleeve 18. Formed in the wall of each bore and spaced generally diametrically from the dowel of each bushing is a generally half-cylindrical undercut or pocket 51 for receiving the dowel of the other bushing. Thus, the dowel 50 of each bushing telescopes slidably but snugly into the pocket 51 of the other bushing during assembly of the bushings.

Assembly of the components of the spring assembly 10 is effected simply by slipping one end portion of the spring 15 onto the sleeve 18 of one of the bushings 16, 17 and then by telescoping the sleeve of the other bushing into the other end portion of the spring. As the bushings are pushed together the dowels 50 slide into the pockets 51 and then the hooks 31 of the fingers 30 snap past and interlock with the hooks 41 of the grooves 40. As a result, the bushing 16 is restricted against rotational and axial movement relative to the bushing 17 and, in addition, the spring 15 is held in assembled relation with the bushings without need of any of the spring coils contracting around and gripping the sleeves 18. Accordingly, all coils of the spring may be fully active at all times.

The arrangement described above enables the overall length of the spring assembly 10 to be changed within certain limits to accommodate spring lengths or space requirements of the throttle body 11. FIG. 4 shows the bushings 16, 17 telescoped together to one extreme position with the inboard ends of the two sleeves 18 in abutting engagement with one another in order to accommodate limited axial space in the throttle body. In contrast, FIG. 6 shows the two bushings expanded outwardly to another extreme position in order to accommodate a relatively long spring, which prevents the bushings from telescoping together beyond the position of FIG. 6.

I claim:

1. A torsion spring assembly comprising a coiled helical torsion spring having a plurality of coils including two end coils, first and second bushings having first and second generally cylindrical sleeves, respectively, telescoped into the end coils of said spring, first and second annular flanges formed integrally with and projecting radially outwardly from the outboard ends of the sleeves of said first and second bushings, respectively, and located adjacent said end coils, first means formed integrally with said first sleeve, and second means formed integrally with said second sleeve and directly engaging said means on said first sleeve interiorly of said plurality of coils to restrict rotational and axial movement of said first bushing relative to said second bushing.

2. A torsion spring assembly as defined in claim 1 in which said means on said sleeves are shaped to interlock with a snap fit when the inboard ends of said sleeves are moved axially together.

3. A torsion spring assembly as defined in claim 2 in which said means comprise first and second fingers projecting axially from said sleeves of said first and second bushings, respectively, and first and second grooves formed in the sleeves of said first and second bushings, respectively, and sized to receive said fingers with a snug but slidable fit.

4. A torsion spring assembly as defined in claim 3 further including axially projecting means located near the center of the sleeve of each bushing and adapted to telescope into the sleeve of the other bushing.

5. A torsion spring assembly as defined in claim 4 in which said axially projecting means of each bushing is shaped substantially as a half-cylinder.

6. A torsion spring assembly as defined in claim 5 in which said first and second bushings are identical.

7. A torsion spring assembly as defined in claim 3 including detents formed on each finger and formed in each groove.

8. A torsion spring assembly as defined in claim 1 in which said first and second bushings are identical.

9. A torsion spring assembly as defined in claim 1 in which said means on said sleeves are configured and dimensioned to permit axial movement of said first bushing relative to said second bushing through a limited range.

* * * * *